(12) United States Patent
Meyer et al.

(10) Patent No.: US 6,970,258 B1
(45) Date of Patent: Nov. 29, 2005

(54) NON-PRINTING PATTERNS FOR IMPROVING FONT PRINT QUALITY

(75) Inventors: Robert J. Meyer, Penfield, NY (US); Allen T. Retzlaff, Jr., Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/362,020

(22) Filed: Jul. 27, 1999

(51) Int. Cl.[7] .............................................. G06F 15/00
(52) U.S. Cl. ........................ 358/1.11; 358/447; 358/448
(58) Field of Search ............................... 358/1.11, 487, 358/448, 462, 532; 382/195, 199, 203, 254, 382/264, 266, 275, 132, 256, 258, 274; 347/254, 347/195; 399/66, 67

(56) References Cited

U.S. PATENT DOCUMENTS

| | | | |
|---|---|---|---|
| 3,784,397 A | 1/1974 | Sato et al. ............... 117/37 LE |
| 4,544,264 A | 10/1985 | Bassetti et al. ........... 355/14 R |
| 4,544,922 A | 10/1985 | Watanabe et al. ........... 340/728 |
| 4,625,222 A | 11/1986 | Bassetti et al. ............. 346/160 |
| 4,675,830 A | 6/1987 | Hawkins ..................... 364/518 |
| 4,847,641 A | 7/1989 | Tung ........................... 346/154 |
| 4,868,600 A | 9/1989 | Hays et al. .................. 355/259 |
| 5,029,108 A | 7/1991 | Lung ........................... 364/519 |
| 5,184,226 A | 2/1993 | Cianciosi .................... 258/296 |
| 5,193,008 A | 3/1993 | Frazier et al. ............... 358/298 |
| 5,299,308 A | 3/1994 | Suzuki et al. ................ 395/162 |
| 5,337,162 A | 8/1994 | Sakano ........................ 358/458 |
| 5,459,828 A * | 10/1995 | Zack et al. ................. 358/1.11 |
| 5,479,175 A | 12/1995 | Cianciosi et al. ........... 347/252 |
| 5,504,462 A | 4/1996 | Cianciosi et al. ........... 332/109 |
| 5,555,557 A | 9/1996 | Mailloux ..................... 382/299 |
| 5,673,121 A | 9/1997 | Wang .......................... 358/456 |
| 5,706,046 A * | 1/1998 | Eki et al. ..................... 347/252 |
| 5,740,330 A | 4/1998 | Abe ............................. 395/102 |
| 5,835,123 A * | 11/1998 | Chung et al. ................ 347/251 |
| 6,038,039 A * | 3/2000 | Zeng ........................... 358/447 |
| 6,177,948 B1 * | 1/2001 | Estabrooks et al. ......... 347/129 |
| 6,181,438 B1 | 1/2001 | Bracco et al. ............... 358/1.9 |
| 6,606,470 B1 | 8/2003 | Wibbels et al. ............. 399/156 |

* cited by examiner

*Primary Examiner*—Twyler Lamb
(74) *Attorney, Agent, or Firm*—Christopher D. Wait

(57) ABSTRACT

Utilization of non-printing high-spatial-frequency auxiliary pixels are introduced into the bitmap of a font to obtain local control of the text image development by modification of local average voltage in the development nip. These auxiliary pixels embody frequencies or levels of charge that are past the threshold for printing on the Modulation Transfer Function (MTF) curve, and therefore by themselves result in no toner deposition on the resultant page. These auxiliary pixels will however, position the toner cloud by modulating it and compensate for cleaning field and toner supply effects. This will better position the toner cloud to ensure adequate toner supply to all parts of the font so that the desired printing pixels will print as intended.

18 Claims, 8 Drawing Sheets

NON-PRINTING PATTERNS FOR IMPROVING FONT PRINT QUALITY

RELATED CASES

Cross reference is made to the following applications filed concurrently and incorporated by reference herein: Ser. No. 09/362,021, entitled "Auxiliary Pixel Patterns For Improving Print Quality" by Robert J. Meyer and Allen T. Retzlaff, Jr., Ser. No. 09/362,022, entitled "Improved Digital Halftone With Auxiliary Pixels" by Robert J. Meyer and Allen T. Retzlaff, Jr.

BACKGROUND OF THE INVENTION AND MATERIAL DISCLOSURE STATEMENT

The present invention relates to improving text and font information in electrostatographic printers copiers and, concerns solving the image problems of edge delineation, edge placement, leading edge deletion, and more particularly serif and other detail deletion in a text image. Such leading edge deletion and placement problems may manifest as phenomena often referred to as line shrinkage, halo and white gap artifacts. These artifacts are also sometimes referred to as "slow toner".

In a typical electrophotographic printing machine, a photoreceptor is charged and exposed to record an electrostatic latent image therein. The photoreceptor is advanced to a development station where toner is deposited on the latent image. One type of development system forms a toner cloud in the development zone. An example of this type of development system is described in U.S. Pat. No. 4,868,600, which is herein incorporated in its entirety by reference.

It has been found that when a toner powder cloud development system is used, large amounts of toner are deposited where there is an uninterrupted expanse of charged area (such as toward the middle of large image shapes), and toner is starved from locations where there is a strong or sudden change in charge (as found with narrow lines or shapes and on the edges of larger shapes). The result for fonts is a loss of serif and other text detail. The effect on large shapes causes them to exhibit a defect called halo, which manifests itself most clearly at the interfaces of solid colors. Halo in color systems appears as white lines at interfaces which should otherwise be a perfect match between two colors. This defect is also observable in single color images as an edge distortion or displacement and line shrinkage dependent on the size of the printed object. Line shrinkage of course leads to poor line and text quality due to an erosion or shrinkage of the line edges, corners, serifs and other detail. These problems are particularly exacerbated at faster system through put speeds. Various approaches have been devised to solve these highlight and shadow detail slow toner effects.

The following patents appear to be relevant to manipulation and enhancement of the edge of image shapes, text and fonts and are hereby incorporated by reference for their teaching.

In U.S. Pat. No. 4,847,641 to Tung, print enhancement circuitry to enhance the printed image produced by a laser beam printer is interposed a between the character generator circuits and the laser drive circuits to modify the laser drive signals provided by the character generator circuits. Bit data representing successive lines of the bit map for a desired image are stored in a first-in first-out (FIFO) buffer. The bit pattern sample window having a central cell (bit) and a selected (arbitrary) number of neighboring bits is compared to a number of matching bit patterns or templates, each of which is associated with an error element or cell. When a logic matching network detects a match, a modification signal associated with a unique compensation cell (bit) is generated. The sample window central bit is then replaced (modified) with the unique compensation bit required by the matching template. In this manner, all bits in a desired bit map, or set of bit maps, are examined and their corresponding laser drive signals modified to compensate for the errors associated with the matched templates in a piece-wise manner.

U.S. Pat. No. 4,544,264 to Bassetti et al. discloses an electrophotographic printing machine with circuits to enhance the printing of fine lines, such as lines of a single picture element (pel) in width. Provision is made for broadening such lines in one dimension by adding small "black" areas to each edge of the fine line in order to broaden it. In a second dimension, perpendicular to the first dimension, lines are broadened by placing gray pels next to black pels. The disclosure also discusses specific cases in which it may be considered desirable to inhibit the enhancement signals.

U.S. Pat. No. 5,029,108 to Lung discloses an edge enhancement method and apparatus for dot matrix devices wherein a group of gradient mask matrices are applied to a "current matrix", wherein a target pixel is surrounded by neighboring pixels, to determine if the target pixel is at a location where a change of brightness occurs. From this matrix operation, a conclusion is derived as to the existence or non-existence of an edge and the direction of the brightness change. The current matrix and a predetermined number of previously evaluated and yet to be evaluated pixels are then compared to a set of reference bit patterns which depict possible segment changes to be corrected. If the result indicates that the target pixel is on an edge of a changing edge segment, a corresponding code will be generated to modify the target pixel to enhance the smoothness of a segment transition. In the case of an electrophotographic printing machine, the specific code will change either the location or the size of the target pixel; whereas in the case of a monochrome screen display, the specific code will change the intensity of the target pixel.

U.S. Pat. No. 5,479,175 to Cianciosi et al. discribes an apparatus for enhancing the output along edges of discharged area developed regions in a tri-level imaging system employing a pulse width and position modulated signal ROS for exposure. This enables the identification and selective alteration of video data used to drive the ROS so as to extend the developed regions by a selected amount and eliminate digitization artifacts present in the image to be printed. The extension of the discharged area developed regions is accomplished by extending the width of, or adding separate, exposure pulses in adjacent areas to enable development within a portion of those regions.

U.S. Pat. No. 5,193,008 to Frazier et al., discloses that the output of a conventional laser printer having a resolution of 300×300 dots per inch (dpi), and a predetermined threshold level for forming image dots, is enhanced by selectively providing interleaved image dots between the normal scan lines of the laser printer. Such interleaved image dots between scan lines may be achieved by appropriately energizing the two pixels directly above and directly below that desired interleaved dot, with the energizations at one or both pixels being selectively below the threshold level for producing a dot on the scan line, but with the combined energization at the desired interleaved point being above the threshold level to produce the desired interleaved dot. An input 600×600 bit map may be stored in a random access memory, and three vertically aligned bits from one main scan line and adjacent 600 dpi lines above and below are drawn from the RAM and are supplied to a logic and video output circuit which produces variable pulse width modulated pulses to the laser printer to produce the enhanced image.

Therefore, there exists a need for techniques which will solve these halo, loss of font detail, serifs and slow toner effects. Further, there exists a demand for increasing the through-put of printing and digital imaging systems without incurring or exacerbating these problems. Thus, it would be desirable to solve these and other deficiencies and disadvantages.

SUMMARY OF THE INVENTION

The present invention relates to an improved electronically stored font for use in an electrostatographic machine, comprising a font representation and a non-printing auxiliary pixel. The auxiliary pixel is embedded in the font representation to improve the printing of the font.

Another aspect of the present invention relates to a method for improving the printing of a text image; including receiving text data, and processing the text data with a font representation including embedded non-printing auxiliary pixels therein.

In accordance with still another aspect of the present invention, there is provided in a digital imaging system a method for optimizing a rendition of a text image. The method comprises receiving text data. The received text data is processed with an font representation including embedded therein nonprinting auxiliary pixels to improve the rendition of the text image.

DESCRIPTION OF THE INVENTION

Figure 1:
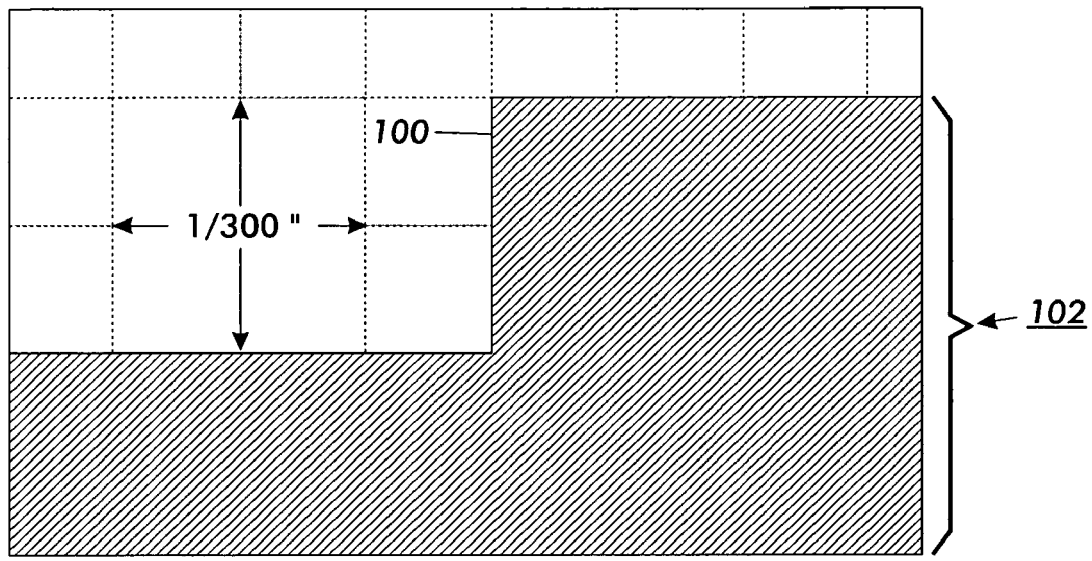
FIG. 1 is part of a line, hypothetically rendered at 300×300 dpi.

For a general understanding of the present invention, reference is made to the drawings. In the drawings, like reference numerals have been used throughout to designate identical elements. In describing the present invention, the following term(s) have been used in the description.

An "image" is a pattern of physical light. It is understood that an image may be further comprised of shapes. An image as such, may include characters, words, and text as well as other features such as graphics. An image may be divided into "segments" or "regions", each of which is itself an image. A region of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image.

Each location in an image may be called a "pixel." A "pixel" is the smallest segment of an image whose value is indicated in an item of data defining the image. In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color form" of an image, the binary form, gray scale form, and color form each being a two-dimensional array defining an image.

An "edge" occurs in an image when two neighboring pixels have sufficiently different pixel values according to an appropriate criterion for the occurrence of an edge between them. The term "edge pixel" may be applied to one or both of two neighboring pixels between which an edge occurs.

An "image characteristic" or "characteristic" is a measurable attribute of an image. An operation can "measure" a characteristic by producing data indicating the characteristic using data defining an image. A characteristic is measured "for an image" if the characteristic is measured in a manner that is likely to produce approximately the same result each time it occurs.

A "version" of a first image is a second image produced using an item of data defining the first image. The second image may be identical to the first image, or it may be modified, such as by image processing operations.

An "image input terminal" (IIT) is a device that can receive an image and provide an item of data defining a version of the image. A "scanner" is an image input device that receives an image by a scanning operation, such as by scanning a hardcopy document. An "image output terminal" (IOT) is a device that can receive an item of data defining an image and provide the image as a visual output. A "xerographic marking engine" is an image output device that provides the output image in hardcopy document form.

A "lead edge deletion" is an image defect which occurs on the leading or first-printing edge of a solid area. It is an edge displacement in a direction opposite to the process motion of the deposited toner as with respect to the lead edge of the latent electrostatic image pattern on the photoreceptor.

An operation performs "image processing" when it operates on an item of data that relates to part of an image. A "morphological" or "logic-based" operation operates using logical operators (e.g., AND, OR, INV, NOT) applied to a digital image. In particular, the logic operations are typically applied in association with a "structuring element" such as an aperture having a predefined shape or other set of characteristics.

Turning to FIG. 1, depicted is a region of an image as at a diagonal edge 100 on an image shape 102. For this image in the original data a pixel is 300 by 300 dots per inch (dpi). At that resolution diagonals will exhibit distinct jagged stair-case transitions in the edge 100 of the image shape 102.

Figure 2:
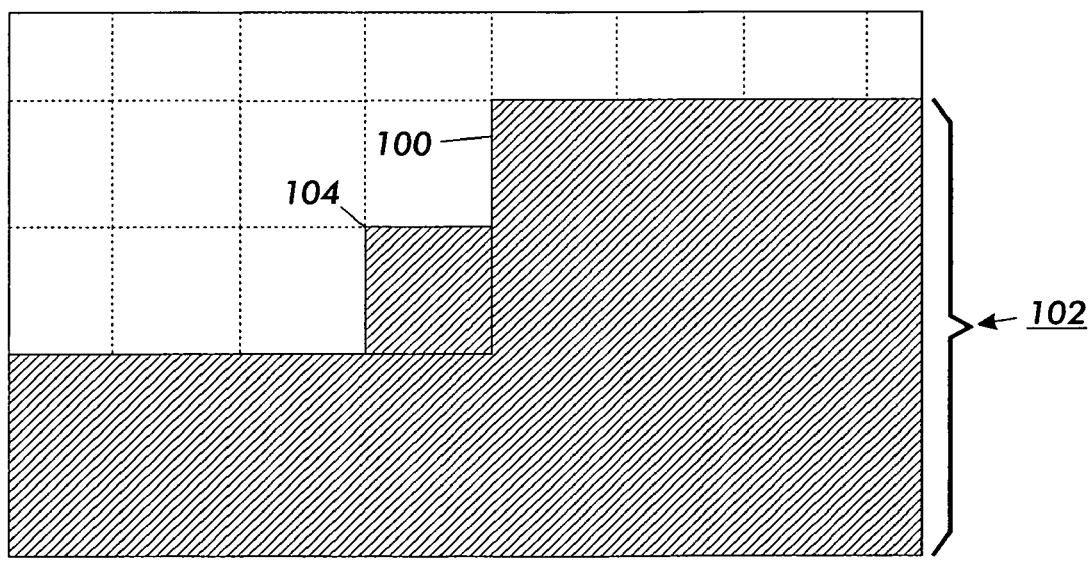
FIG. 2 is the FIG. 1 line smoothed by templates and rendered at 600×600 dpi.

FIG. 2 shows a possible result to the data in FIG. 1 after expansion to 600×600 dpi by means of pattern matching templates and application of Resolution Enhancement Technology (RET). RET is a technique that smoothes out the jagged stair-case transition resulting from digitization by inserting an added pixel 104. This new added pixel is at the higher dpi resolution.

Figure 3:
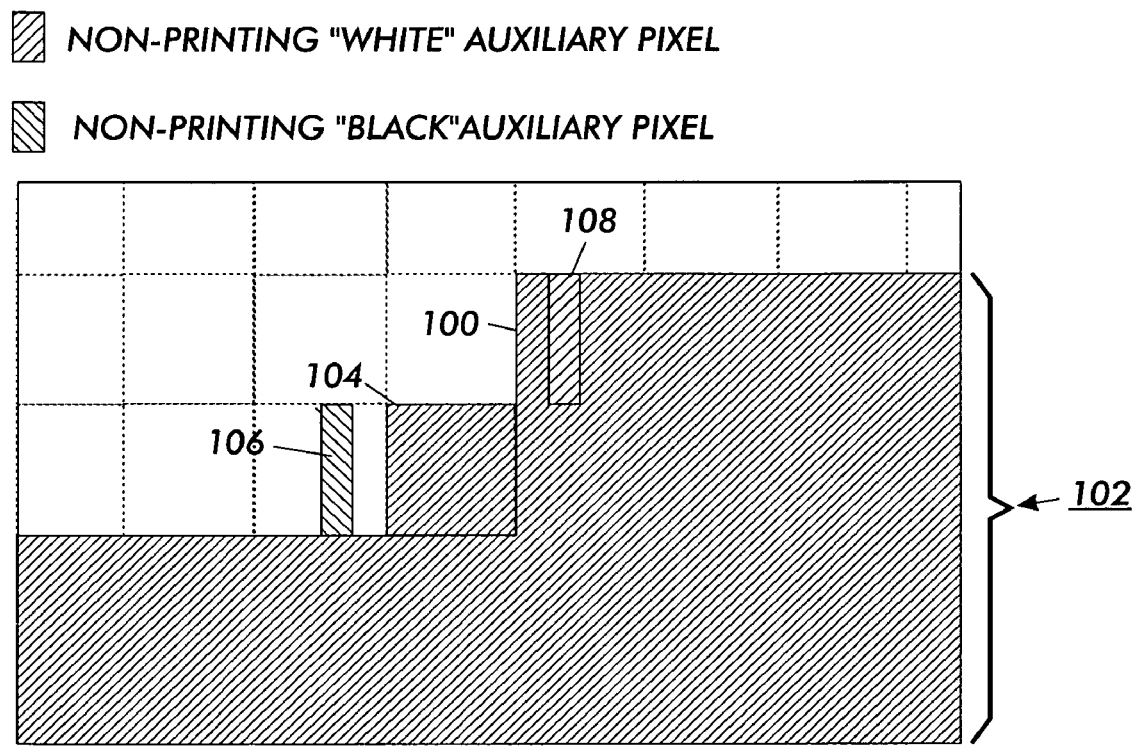
FIG. 3 is the FIG. 2 line with non-printing auxiliary dots.

In FIG. 3 there is an example of the present invention as applied to the data found in FIG. 2. The RET-generated added pixel 104 is retained. However, ultra fine pixels herein referred to as "non-printing" pixels, or "auxiliary" pixels as substituted into the bitmap, have been placed close to the edge of, but both interior and exterior to the image shape. A "black" type of non-printing auxiliary pixel 106 is placed exterior to the image shape and a "white" type of non-printing auxiliary pixel 108 is placed interior to the image shape. It should be noted that the RET generated pixel 104 was retained in FIG. 3 for illustrative purposes only, it is not required for the present invention and in a preferred embodiment may in fact be replaced by a suitable auxiliary pixel. The auxiliary pixels 106 & 108 (and patterns of them in a preferred embodiment) are used to modulate the toner cloud density and distance from the photoreceptor during development.

These auxiliary pixels 106 & 108 may be above the frequency for printing on the MTF curve or they may be of sub-critical density, that is below the normal density threshold for printout in their respective regions so that they are non-printing in effect. This may be achieved typically in two ways; first in a laser based system for example, the laser may be modulated in a manner such that the laser intensity is so reduced that the auxiliary pixel location is achieved by substantial under-exposure. As a result, much more charge is retained on the photoreceptor at that location than there would be for a normal fully developed pixel at that location. Second, in the alternative or in combination with laser intensity modulation, the pulse width may be modulated to such a high frequency and thereby down to such a small size that no toner (or an insufficient amount of toner to survive transfer to a substrate) adheres to the photoreceptor sufficient to allow printing. A pulse width and position modulator (PWPM) may be used in a preferred embodiment to accomplish this. PWPM techniques are well known in the art. U.S. Pat. No. 5,184,226 and U.S. Pat. No. 5,504,462, which are both incorporated by reference herein for their teaching, provide exemplary examples.

The addition of such small non-printing pixels to a digital image will move the toner cloud toward or away from the photoreceptor in the neighborhood of an area to be developed. The auxiliary pixels may be either 106 "black" or "on" pixels in an otherwise "off" area, or 108 "white" (that is, "off" pixels in an otherwise "on" area). Depending on the system needs, the actual laser intensity or MTF frequency may be the same for both the "white" 108 and "black" 106 auxiliary pixel. In that case there is really only a single type of auxiliary pixel placed both within and without the image shape. When two types of auxiliary pixel are employed, their density or frequency is different but they are still always non-printing in and of themselves, whether employed singly or adjacently clumped together in an group of auxiliary pixels. By that we mean that all pixel locations that are originally "on" in the bit map will still print as black, regardless that an auxiliary pixel has been substituted at that location. All pixel locations that are "off" will also still not print, regardless that an auxiliary pixel has been substituted at that location. So while a 108 "white" auxiliary pixel taken and placed in isolation might actually print, when used as per the invention and substituted in an "on" printing area, there is no effective change relative to the intended input image bitmap. Thus it is non-printing in effect in and of itself, even when used in a clustered combination or directly adjacent any number of other auxiliary pixels.

The auxiliary pixels will produce small attractively biased or reversed biased areas on the photoreceptor. The attractively biased 106 areas will not develop toner on the photoreceptor, or develop so little, that it will not appear in the final print, because they are beyond the critical frequency on the development (or transfer) MTF. What they will do however, is encourage a toner cloud close enough to the photoreceptor to mitigate the spreading effect of the surrounding cleaning field. Of course, a corresponding statement in the alternate is true for the reverse biased areas 108; they will discourage or repel toner away from the photoreceptor. Thus, auxiliary pixels will have a printing effect upon original pixels which they neighbor. The result is that the development cloud (or a development brush) will not be repelled as much from surrounding white areas due to "black" non-printing auxiliary pixels 106, and the development field will not be so strong near the sharp edges, due to non-printing "white" auxiliary pixels 108. In this way auxiliary pixels will enhance the printing of original pixels in a manner as intended by the original bit map by mitigating the edge displacement and halo problems endemic to increased printing system speed and throughput. Numerous options exist for placement of non-printing pixels to use this effect.

Figure 4:
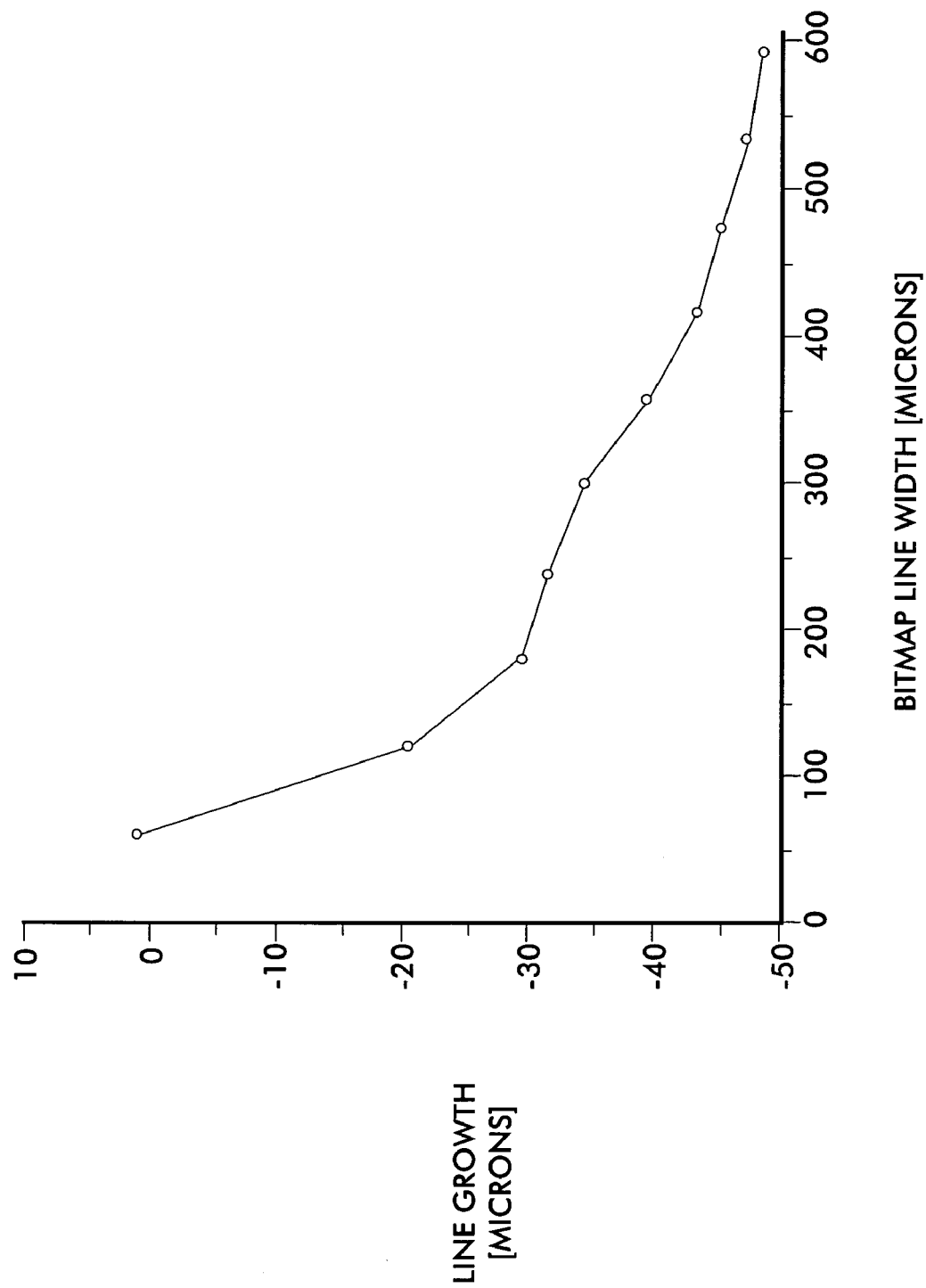
FIG. 4 is a graph of empirically observed line growth for parallel positive lines.

FIG. 4 depicts the experimentally observed negative line growth found with parallel positive lines. This data substantiates the progressive line narrowing for positive (that is, black on white background) parallel lines. The wider the line, the greater the amount of line shrinkage. There are two effects in operation here causing the negative line growth. First, the MTF of the cleaning field spreads the white background area across the black line, thus displacing the edge inward. Second, the strong demand for toner in the middle of the line "recruits" toner from the edge of the line, thus further reducing supply at the edge. In order to control line growth, non-printing black auxiliary pixels 106 are inserted around the line and non printing white pixels 108 are inserted within the line.

Figure 5:
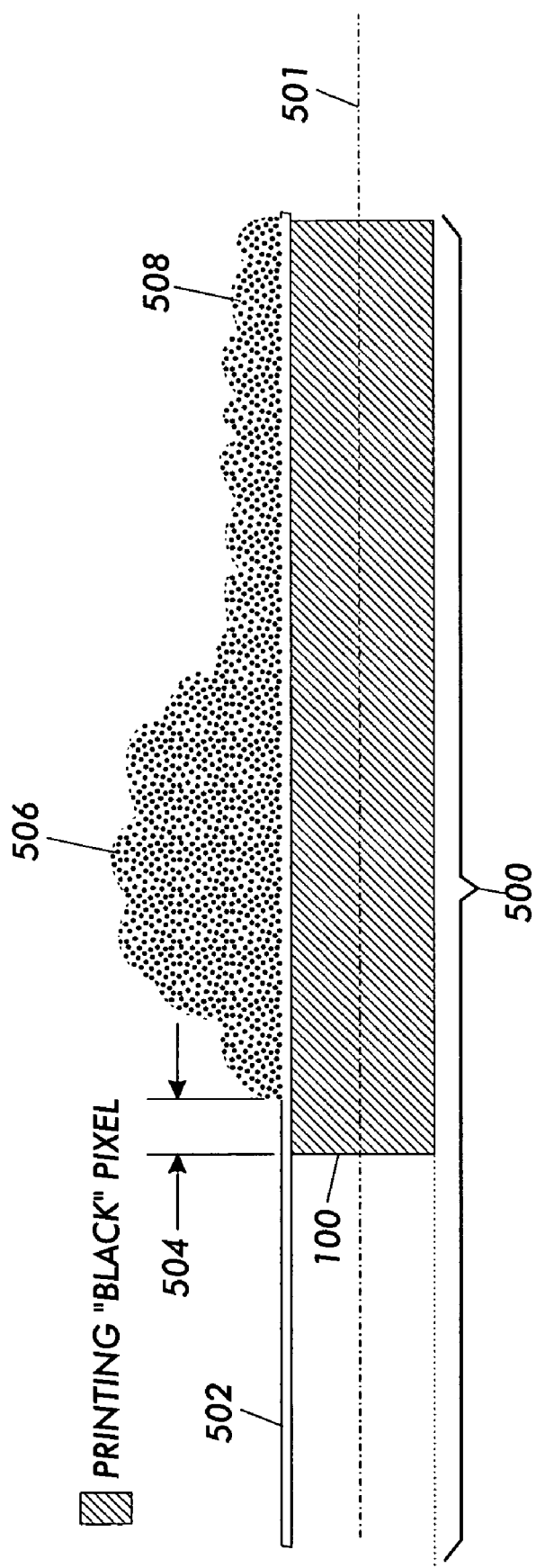
FIG. 5 is a sectional, elevational view taken through an intended bit map for a large shape in the image at its edge depicting the deposited toner resulting on the photoreceptor.

In FIG. 5 we have depicted a bitmap slice 500 of a pixel pattern for a solid shape at it's edge. Cross-sectioning through the bitmap slice 500 at line 501, and looking at the photoreceptor 502 as on edge at that location corresponding to the bitmap slice 500 data, display is made of a typical resulting toner accumulation as found on a photoreceptor 502. There we can see lead edge deletion by the edge displacement 504 of the toner from the intended edge 100. Also note toner excess buildup 506 as in contrast to an area of desired toner coating 508.

The origin of edge displacement 504 and the resulting lead edge deletion image defect is best understood in terms of the physics of the toner cloud development process. When a toner cloud developer subsystem is not printing, the toner cloud is repelled from the photoreceptor by a cleaning field. When the latent image on the photoreceptor changes from background (i.e., no developed toner) to image (developed toner desired), the directions of the fields in the space above the photoreceptor change directions, from a repelling or cleaning field to an attractive or developing field. This is accompanied by the usual fringe field effects. Since the toner cloud is initially some distance from the photoreceptor, there is a finite time that it takes the cloud to respond to the field and reach the photoreceptor. This cloud motion time depends on the tribo of the toner in the cloud and the development field strength. During this finite time no toner is being developed on the latent image, and the lead edge deletion results. The length of the lead edge deletion (edge displacement 504) on the image then increases as the product of this cloud motion time, and the speed of the photoreceptor with respect to the developer housing. Thus, the lead edge deletion problem becomes worse as the process speed increases.

Figure 6:
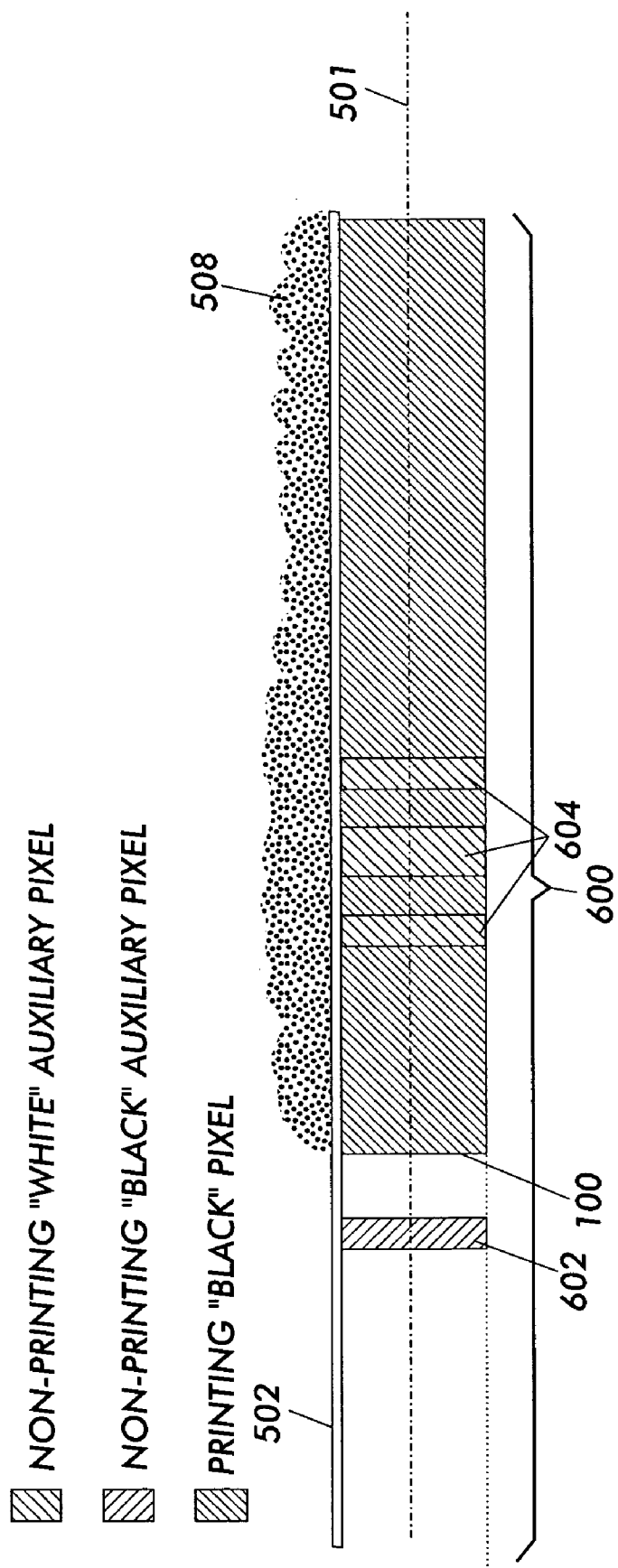
FIG. 6 is a sectional, elevational view and bit map of the FIG. 5 shape with the addition of auxiliary pixels.

With FIG. 6 the input data of FIG. 5 is rendered with the insertion of auxiliary pixels in a manner exemplary of a preferred embodiment of the present invention. The bitmap slice 600 comprises the input data of bitmap slice 500 with the addition of non-printing "black" pixels 602 and non-printing "white" pixels 604. Again photoreceptor 502 is displayed on edge at the location corresponding to the cross-section line 601 through bitmap slice 600. This shows how a preferred embodiment of auxiliary pixels yields an even coating of toner 508 in all intended areas, and the absence of any edge displacement 504 from the intended edge 100.

There is a corresponding image defect on the trailing edge of solid area images, image drag-out. In this case, the edge displacement corresponds to toner moved into the background area which should remain with-out toner. This results both from Coulomb repulsion between charged toner particles, and from fringe field effects. Image drag-out is more endemic to liquid development systems, and is minimized by the use of "white" auxiliary pixels 604 dispersed within the solid image near the trailing edge. This has the purpose of decreasing the amount of toner deposited along this trailing edge. As the height of the toner pile 506 near this trail edge decreases, the lateral fringe fields forcing toner into the neighboring background area decreases.

There are two actions associated with line displacement to be overcome. First, the MTF of the cleaning field spreads the white background area across the black shape, thus displacing the edge inward. Second, the strong demand for toner in the middle of the shape recruits toner from its edge, thus further reducing the supply at the edge. The positive "black" auxiliary pixels 602 diminish the cleaning field, while the "white" auxiliary pixels 604 reduce demand toward the middle of shape. Since there is less toner deposited in the middle of the shape, it is now available for development at the edge, and thus the shape will be widened. This widening occurs at the cost of optical density in the middle of the shape, which will be small, and the marginal increase in optical density with respect to DMA (developed mass per unit area) is less than at lower DMAs.

The present invention is directed to stored font representations. By the term font we mean: a collection of capital and lowercase letters, numeric and special characters of one particular typeface and style. The fonts for discussion here are the type electronically stored as intended for use in electronic displays and printers, and most particularly as intended for electrostatographic printers. As such, the term font includes a generated font as provided and utilized in computers or computational, display and printing systems.

The typical font representation is a bitmap representation. However, because of storage constraints it has become the norm to use other representations for font storage so as to maximize flexibility while minimizing storage requirements. An important type of font representation is the contour type. Font contours may be represented by spline knots and stored on disk to be rasterized (turned into bitmaps) later. Skeletal points as well as contours may also be employed as for example in U.S. Pat. No. 4,675,830 to Hawkins, which is hereby incorporated by reference for its teaching. Another type of font representation is a Meta font type where there is no artwork master to start with and spline functions are used instead. Spline curves are constructed that pass through given spatial points and form the median or skeleton of the desired font bit map.

Figure 7:
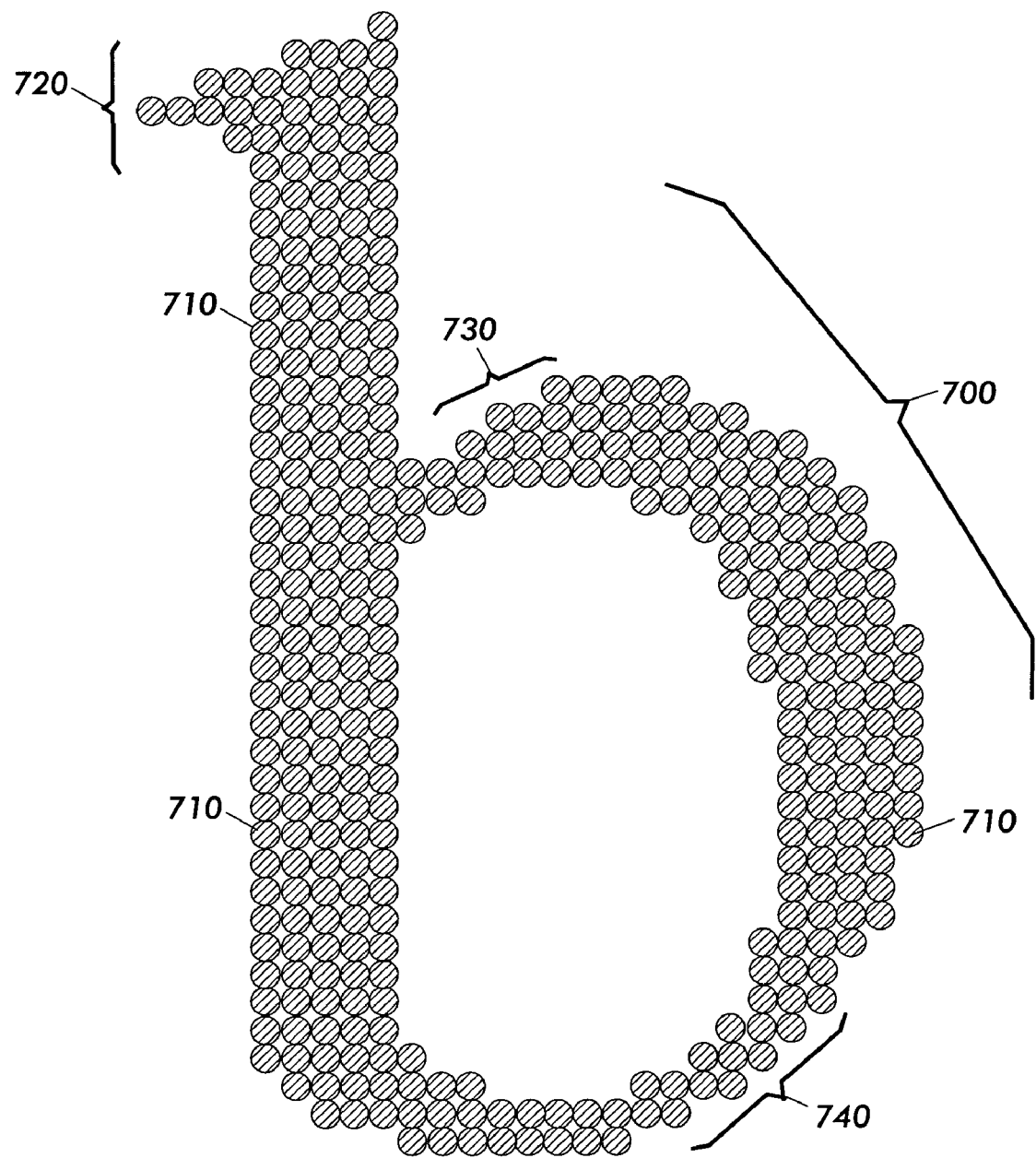
FIG. 7 is a bit map of a lower case letter "b".

Turning now to FIG. 7 there is presented a bitmap representation of a lower case character "b" 700. Character "b" 700 has been suitably enlarged as an aid to delineating its constituent printing pixels 710. Wedge serif 720 is an area of detail particularly susceptible to edge displacement and slow toner problems. Thin stroke areas 730 and 740 are areas of detail also susceptible toner starvation and slow toner problems like the tip of wedge serif 720.

Figure 8:
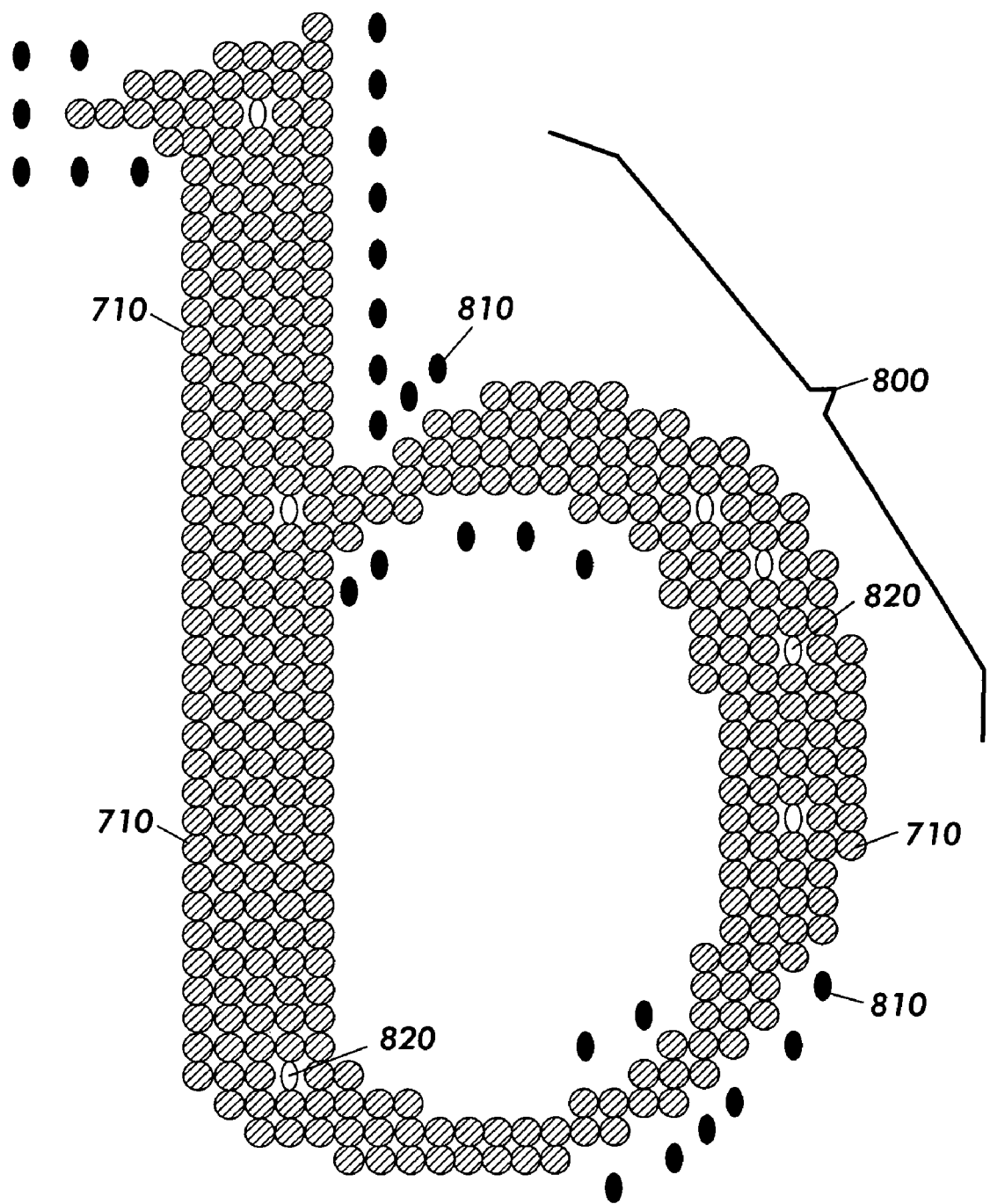
FIG. 8 is a bit map of a lower case letter "b" with auxiliary pixels of the present invention applied.

In FIG. 8 the bitmap data 700 of FIG. 7 is rendered with the insertion of black auxiliary pixels 810 and white auxiliary pixels 820 to create bitmap 800 in a manner exemplary of a preferred embodiment of the present invention. The black auxiliary pixels 810 have been placed with a particular preference to the detail areas of character "b" 700, namely 720, 730 and 740 as well as the areas where edge displacement would be anticipated. The white auxiliary pixels 820 have been placed at areas of relatively high average toner on area. It should be noted that while this is a preferred embodiment example, an optimum pattern is system dependent and operationally dependent. Different systems will favor different patterns and the same system operated at varying speeds may require different patterns. However the effect of auxiliary pixels is cumulative and even a few such is better than none. In all cases though, the focus of the black auxiliary pixels 810 will be about font details such as serifs and the like.

The auxiliary pixels 810 and 820 become patterns which may then be stored as part of the font representation. These patterns may then be the constructs for additional spline curves and stored with the font representation as additional data or as a new kind of font hint. Hint generation is a technique well understood by those skilled in the art, an exemplary example of which may be found in U.S. Pat. No. 5,459,828 to Zack et al. and incorporated by reference herein for its teaching. Thus at the same step as the rasterazation is performed on the font contour to generate the desired font bitmap, the rasterizer also generates the auxiliary pixel data into the font bitmap as well.

An alternative preferred approach generates auxiliary pixel data on the fly for a given font character after the font representation is rasterized. One such approach would be the dilation and outline technique as discussed in co-filed application. However in a preferred approach as focused upon fonts, greater emphasis is given to the small detailed areas of font characters like serifs etc. Thus in an alternative preferred approach as will be well understood by those skilled in the art, an n×n window is scanned across the bitmap data and a count of "on" pixels is made. For a count between zero and some small subset of the n×n total, a template of auxiliary pixels is embedded as centered in the image data at that location. Counts which are above the small subset number result in no change to the data and the window moves on to the next location.

For example, in a preferred arrangement a window of 5×5 is utilized. This window is moved across the bitmap until the center pixel of the window encounters an "on" or black pixel value. A count is made of the other 24 pixels in the window at that location. Black pixels count as one and white pixels do not count. If the count is from zero to four, a template of auxiliary pixels as centered about the center pixel is substituted into the original bitmap with a morphological Boolean OR operation. If the count is greater than four, then this is not an area of sufficient detail and the window is moved on to the next location and the above steps are repeated. In a preferred embodiment the template consists of six auxiliary pixels. One auxiliary pixel to each corner of the center pixel as located in the 5×5 window and one more both above and below and as spaced one pixel apart from the center pixel.

Figure 9:
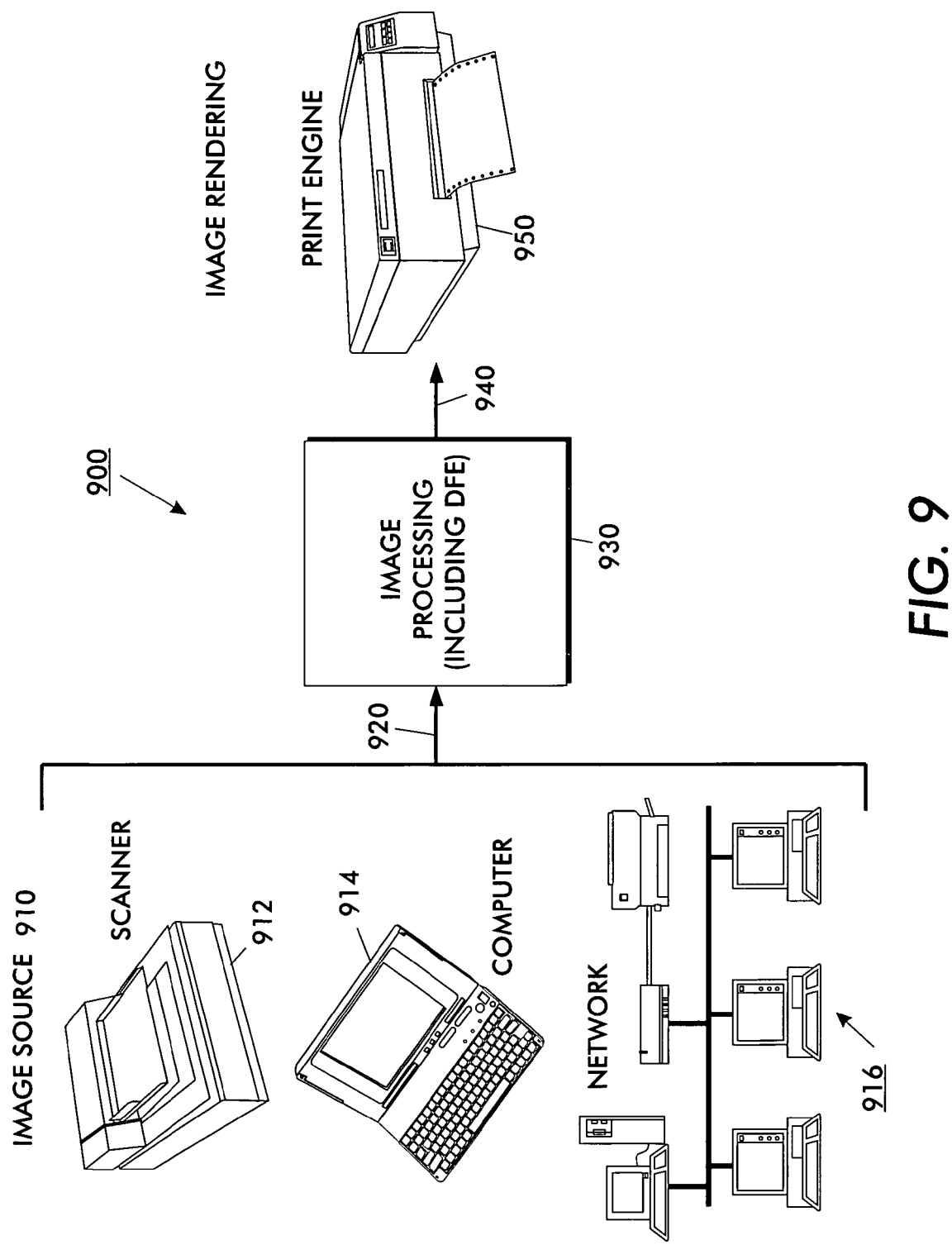
FIG. 9 is a general representation of a suitable system-level embodiment for the invention.

Turning now to FIG. 9, there is shown an embodiment of a digital imaging system 900 that incorporates the features of the present invention. Digital imaging system 900 includes image source 910 that may include scanner 912, computer 914, network 916 or any similar or equivalent image input terminal (IIT) to generate original input image data 920. Image data 920, representing an image to be printed, is supplied to an image processing system 930, that may incorporate what is known in the art as a digital front end (DFE). Image processing system 930 process the received original image data 920 to produce print ready binary data 940 that is supplied to print engine 950. In response to print ready data 940, print engine 950 generates an output document or print image on suitable media. Print engine 950 is preferably an electrophotographic engine; however, one skilled in the art will appreciate that any other suitable engine may be used such as an ionographic engine. The present invention is directed towards aspects of image processing system 930 depicted in FIG. 9. In particular, the present invention is directed to embedding auxiliary pixels into image data 920.

There are a variety of approaches apparent to those skilled in the art that may be taken in image processing system 930 for processing received original image data 920 so as to produce binary data 940 with embedded auxiliary pixels. It will also be appreciated by those skilled in the art that the exact type and pattern of auxiliary pixel utilized will vary depending upon the particulars of print engine 950. One preferred approach utilizes a scalar rasterizer located in a DFE as found in the image processing system 930. The rasterizer converts the font contour representation containing also the auxiliary pixel representation into a bitmap form, and thereby inserting auxiliary pixels into the image data 920. In an alternative preferred approach the auxiliary pixels are inserted into the font image data after the font representation has been converted into a bitmap form. A window is scanned across the bitmap data and a counter is used to detect if a given "on" pixel is in an area of detail based upon how many other "on" pixels are found nearby. If an area of detail is detected then a template of auxiliary pixels are inserted into the image data 920 with a Boolean morphological OR operation.

Thus by introducing non-printing auxiliary pixels into the bitmap of a font image, local control of the image development is obtained by modification of local average voltage in the development nip. Using auxiliary pixels positions the toner cloud by modulating it and may also compensate for cleaning field and toner supply effects. Auxiliary pixels utilized as discussed above can better position the toner cloud and ensure adequate toner supply to all parts of the text image so that the desired printing pixels will print as intended and in this way overcome edge displacement, image halo, the rendition serif detail, as well as other slow toner problems.

While the embodiment disclosed herein is preferred, it will be appreciated from this teaching that other variations or examples may be made by those skilled in the art. For example other embodiments would include: ionographic systems; brush roller toner delivery systems; and CEP—Contact Electrostatic Printing or similar charged cake toner delivery systems. However, these examples are not exhaustive, nor is there any intent to exclude various alternative, modifications, variations or improvements therein from being encompassed by the following claims:

What is claimed is:

1. An improved electronically stored font for use in a electrostatographic machine, comprising:
   a font representation having a font image shape; and
   a non-printing "black" auxiliary pixel embedded in the font representation exterior to the font image shape and spaced at least one pixel apart from the font image shape to improve the development of font detail or solve leading edge deletion in the printing of the font.

2. The improved font of claim 1, wherein the font representation is a bit map type.

3. The improved font of claim 1, wherein the font representation is a contour type.

4. The improved font of claim 1, wherein the font representation is a spline-knot type.

5. The improved font of claim 1, wherein the font representation is a meta type.

6. A method for improving the printing of a text image, comprising:
   receiving text data; and
   processing the text data with a font representation including embedded non-printing "black" auxiliary pixels therein, the "black" auxiliary pixels being arranged by the font representation so as to be exterior to and spaced at least one pixel apart from the font image shape so as to improve the development of font areas of detail or solve leading edge deletion in the printing of the font.

7. The method for improving the printing of image text of claim 6, wherein the step of processing includes using a font representation of a bit map type.

8. The method for improving the printing of image text of claim 7, wherein the step of processing includes using a font representation of a contour type.

9. The method for improving the printing of image text of claim 7, wherein the step of processing includes using a font representation of a spline-knot type.

10. The method for improving the printing of image text of claim 7, wherein the step of processing includes using a font representation of a meta type.

11. In a digital imaging system, a method for optimizing a rendition of a text image, comprising:
    receiving text data; and
    processing the text data with a font representation including therein embedded non-printing "black" auxiliary pixels the "black" auxiliary pixels being arranged by the font representation so as to be exterior to and spaced at least one pixel apart from the font image shape so as to improve the development of font areas of detail or solve leading edge deletion in the rendition of the text image.

12. The digital imaging system of claim 11, wherein the step of processing comprises generating image text using a processing system including a digital front end.

13. The digital imaging system of claim 12, wherein the step of generating uses bit map font representation.

14. The digital imaging system of claim 12, wherein the step of generating uses contour font representation.

15. The digital imaging system of claim 12, wherein the step of generating uses spline-knot font representation.

16. The digital imaging system of claim 12, wherein the step of generating uses meta font representation.

17. The digital imaging system of claim 13, wherein the bit map font representation has "black" auxiliary pixels as previously stored therein.

18. The digital imaging system of claim 13, wherein the bit map font representation has "black" auxiliary pixels inserted therein by a method comprising:

stepping a n×n window across each pixel location in the bit map;

counting the number of "on" pixels in the window; and comparing that number against a set threshold number to determine if that location is in an area of font detail.

\* \* \* \* \*